(12) United States Patent
Gwo et al.

(10) Patent No.: US 12,078,535 B2
(45) Date of Patent: Sep. 3, 2024

(54) SINGLE-PHOTON DETECTOR, AND ARRAY AND FABRICATING METHOD THEREOF

(71) Applicant: HERMES-EPITEK CORPORATION, Taipei (TW)

(72) Inventors: Shang-Jr Gwo, New Taipei (TW); Ching-Wen Chang, Kaohsiung (TW)

(73) Assignee: Hermes-Epitek Corporation, Taipei (TW)

( * ) Notice: Subject to any disclaimer, the term of this patent is extended or adjusted under 35 U.S.C. 154(b) by 0 days.

(21) Appl. No.: 17/966,502

(22) Filed: Oct. 14, 2022

(65) Prior Publication Data

US 2024/0125646 A1   Apr. 18, 2024

(51) Int. Cl.
*G01J 1/44* (2006.01)
*G01J 1/04* (2006.01)

(52) U.S. Cl.
CPC .............. *G01J 1/44* (2013.01); *G01J 1/0425* (2013.01); *G01J 2001/442* (2013.01)

(58) Field of Classification Search
CPC ....... G01J 1/44; G01J 1/0425; G01J 2001/442
USPC .............................................. 250/216, 208.1
See application file for complete search history.

(56) References Cited

U.S. PATENT DOCUMENTS

| | | | |
|---|---|---|---|
| 7,151,284 B2 | 12/2006 | Gwo | |
| 9,500,519 B2 | 11/2016 | Tang et al. | |
| 9,726,536 B2 | 8/2017 | Bachar et al. | |
| 2017/0098752 A1 | 4/2017 | You et al. | |
| 2021/0239519 A1* | 8/2021 | Yang | G01J 1/42 |
| 2021/0242390 A1 | 8/2021 | Yang et al. | |
| 2021/0381884 A1 | 12/2021 | Walter et al. | |

FOREIGN PATENT DOCUMENTS

| | | | | |
|---|---|---|---|---|
| CN | 106558632 B | * | 4/2018 | H01L 31/03 |
| KR | 20190098006 | * | 8/2019 | H01L 31/09 |

OTHER PUBLICATIONS

Abhishek Dubey, et al., "Demonstration of a Superior Deep-UV Surface-Enhanced Resonance Raman Scattering (SERRS) Substrate and Single-Base Mutation Detection in Oligonucleotides," J. Am. Chem. Soc, 2021, 143, pp. 19282-19286.

(Continued)

*Primary Examiner* — Thanh Luu
*Assistant Examiner* — Mai Thi Ngoc Tran
(74) *Attorney, Agent, or Firm* — Donald E. Stout; Stout, Uxa & Buyan, LLP

(57) ABSTRACT

The invention provides a single-photon detector that includes a superconducting wire made from a high quality and uniform superconducting film with a higher critical temperature. A reflector or a multilayered reflector with high reflectivity, preferably a nitride-based distributed Bragg reflector, is provided to reflect an incident light to the superconducting wire. A surface-plasmon wavelength-selective surface may be further provided above the superconducting wire to resonantly transmits the incident light within a selective passband, making the single-photon detector operable in the ultraviolet, visible, and infrared wavelength bands. In addition, a large area of superconducting film with high level of uniformity is grown to achieve the up scaling of the single-photon detector and a single-photon detector array.

30 Claims, 7 Drawing Sheets

(56) References Cited

OTHER PUBLICATIONS

Abhishek Dubey, et al., "Aluminum Plasmonics Enriched Ultraviolet GaN Photodetector with Ultrahigh Responsivity, Detectivity, and Broad Bandwidth", Advanced Science Open Access, Jul. 2020, 2002274, www.advancedscience.com.
Wan-Ping Guo et al., "Titanium Nitride Epitaxial Films as a Plasmonic Material Platform: Alternative to Gold", ACS Photonics, Jun. 2019, pp. 1848-1854.
Alexander Korneev, et al., "Quantum Efficiency and Noise Equivalent Power of Nanostructured, NbN, Single-Photon Detectors in the Wavelength Range From Visible to Infrared", IEEE Transactions on Applied Superconductivity, vol. 15, No. 2, Jun. 2005, pp. 571-574.
Risheng Cheng et al., "Superconducting nanowire single-photon detectors fabricated from atomic-layer-deposited NbN", Appl. Phys. Lett. 115, 241101 (2019); https://doi.org/10.1063/1.5131664.
A. Jafari Salim et al., "High Quantum Efficiency and Low Dark Count Rate in Multi-Layer Superconducting Nanowire Single-Photon Detectors", Journal of Applied Physics, vol. 115, 054514 (2014).
Extended European Search Report dated Jan. 15, 2024 in corresponding European Application No. 23189655.6.

\* cited by examiner

SINGLE-PHOTON DETECTOR, AND ARRAY AND FABRICATING METHOD THEREOF

BACKGROUND OF THE INVENTION

1. Field of the Invention

The invention relates to the field of light detection, and more precisely the invention relates to a single-photon detector and a single-photon detector array operable in the ultraviolet, visible, and infrared wavelength bands. The invention further relates to the method for manufacturing the single-photon detector and the single-photon detector array.

2. Description of Related Art

The superconducting nanowire single-photon detectors (SNSPDs) are optical detectors to detect the smallest amounts of light based on a superconducting nanowire. SNSPDs play an increasing role in applications like quantum optics, optical communication, and light detection and ranging (LIDAR). In terms of detector performance, SNSPDs stand out due to high detection efficiency (>90%), picosecond time resolution, short recovery times, and low dark count rates.

SNSPDs detect photons based on the following principle. The nanowire is cooled below its superconducting critical temperature and biased with a direct current less than the superconducting critical current of the nanowire. Once a single photon is absorbed in the meandering nanowire, the superconductivity of the nanowire is locally broken. The localized non-superconducting area or hot spot with finite electrical resistance produces a measurable voltage pulse to be detected. After the photon is absorbed, superconductivity recovers in the nanowire within tens of picosecond (ps) and the SNSPD is ready to detect the next photon.

In single-photon detectors, an optical fiber is generally employed to guide the light to be detected to the detector element, e.g., the superconducting nanowire. The coupling loss occurs between the end of optical fiber and the detector element, leading to a reduction in the efficiency of the detectors. The absorption in the superconducting nanowire can be boosted by varied methods. U.S. Pat. No. 9,500,519 B2 discloses an SNSPD integrated into a chip. A planar waveguide is located on a substrate, and the nanowire is placed on the waveguide. U.S. Pat. No. 9,726,536 B2 discloses an SNSPD that is manufactured directly on the tip of an optical fiber. This configuration boosts the absorption by the back and forth reflection of the optical signal in the optical cavity. U.S. Pub. 2021/0381884 A1 discloses a single photon detector comprising an optical fiber and at least one nanowire, wherein the optical fiber comprises a core and a cladding, a first area of the optical fiber is an entrance area for the optical signal and a second area of the optical fiber is a detector area, and in the detector area the nanowire extends essentially along the optical axis of the optical fiber.

So far, SNSPDs have been primarily used in research and development and have the disadvantage of the spectral range in which the single-photon detector operates efficiently being small. In addition, existing SNSPDs are difficult to manufacture. In addition, for the detection of longer wavelength photons, the detection efficiency of standard SNSPDs decreases significantly[1]. Furthermore, large SNSPD arrays are beneficial for quantum imaging, time-resolved imaging, or LIDAR applications. However, these applications generally require larger arrays than are currently available, both in terms of number of elements and active area. Current device technology is generally limited to single device and needs to be improved to achieve large-scale SNSPDs in real-world applications.

REFERENCES

[1] A. Korneev, V. Matvienko, O. Minaeva, I. Milostnaya, I. Rubtsova, G. Chulkova, K. Smirnov, V. Voronov, G. Gol'tsman, W. Slysz, A. Pearlman, A. Verevkin, and R. Sobolewski, "Quantum efficiency and noise equivalent power of nanostructured, NbN, single-photon detectors in the wavelength range from visible to infrared," *IEEE Transactions on Applied Superconductivity*, vol. 15, pp. 571-574 (2005);

[2] C. W. Cheng, Y. J. Liao, C. Y. Liu, B. H. Wu, S. S. Raja, C. Y. Wang, X. Li, C. K. Shih, L. J. Chen, and S. Gwo, "Epitaxial aluminum-on-sapphire films as a plasmonic material platform for ultraviolet and full visible spectral regions," *ACS Photonics*, vol. 5, pp. 2624-2630 (2018);

[3] W. P. Guo, R. Mishra, C. W. Cheng, B. H. Wu, L. J. Chen, M. T. Lin, and S. Gwo, "Titanium nitride epitaxial films as a plasmonic material platform: alternative to gold," vol. 6, pp. 1848-1854 (2019);

[4] R. Cheng, S. Wang, and H. X. Tang, "Superconducting nanowire single-photon detectors fabricated from atomic-layer-deposited NbN," *Appl. Phys. Lett.*, vol. 115, 241101 (2019).

SUMMARY OF THE INVENTION

In one aspect, a single-photon detector is provided for detecting an incident light and includes a substrate, a reflector disposed on or beneath the substrate, and at least one superconducting wire, preferably single-crystalline, disposed on the reflector or the substrate, wherein the incident light is irradiated on the at least one superconducting wire and/or is reflected to the at least one superconducting wire by the underlying reflector. The reflector can be a single-layered reflector beneath the substrate or a multilayered reflector on the substrate.

In another aspect, in addition to the above architecture, the single-photon detector further includes a dielectric layer covering the at least one superconducting wire and a surface-plasmon wavelength-selective surface comprising a nanostructure array on the dielectric layer, wherein the nanostructure array is configured to enable surface plasmon resonances stimulated by the incident light at one or more wavelengths, the surface-plasmon wavelength-selective surface resonantly transmits the incident light within a passband, and the transmitted light is irradiated on the at least one superconducting wire and/or is reflected to the at least one superconducting wire by the reflector.

In another aspect, a single-photon detector array is provided for detecting an incident light and includes a substrate divided into a plurality of pixels, wherein each pixel includes architecture similar to the single-photon detectors described above, and wherein the center wavelength of the transmitted passband of each pixel may differ from that of adjacent pixels.

In another aspect, a method is provided for manufacturing the described single photon detectors and the single photon detector array. The method comprises the steps of: providing a substrate; forming a reflector on or beneath the substrate; forming a superconducting layer on the reflector or the substrate; and patterning the superconducting layer to form at least one superconducting wire. The method may further comprise: forming a dielectric layer to cover the at least one superconducting wire; forming a conductive layer on the dielectric layer; and patterning the conductive layer to form a surface-plasmon wavelength-selective surface comprising a nanostructure array configured to enable surface plasmon resonances stimulated by an incident light at one or more wavelengths.

By improvements in fabrication and material growth technique, a high-efficiency single-photon detector is made from a high quality and uniform superconducting film with a higher critical temperature. In addition, a large area of superconducting film with high level of uniformity can be grown to realize the up scaling of the single-photon detectors. A large-scale superconducting single-photon detector array provides unmatched performances for detection and imaging over a large spectral bandwidth, from ultraviolet to infrared wavelengths.

DETAILED DESCRIPTION OF THE PREFERRED EMBODIMENT

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Figure 1:
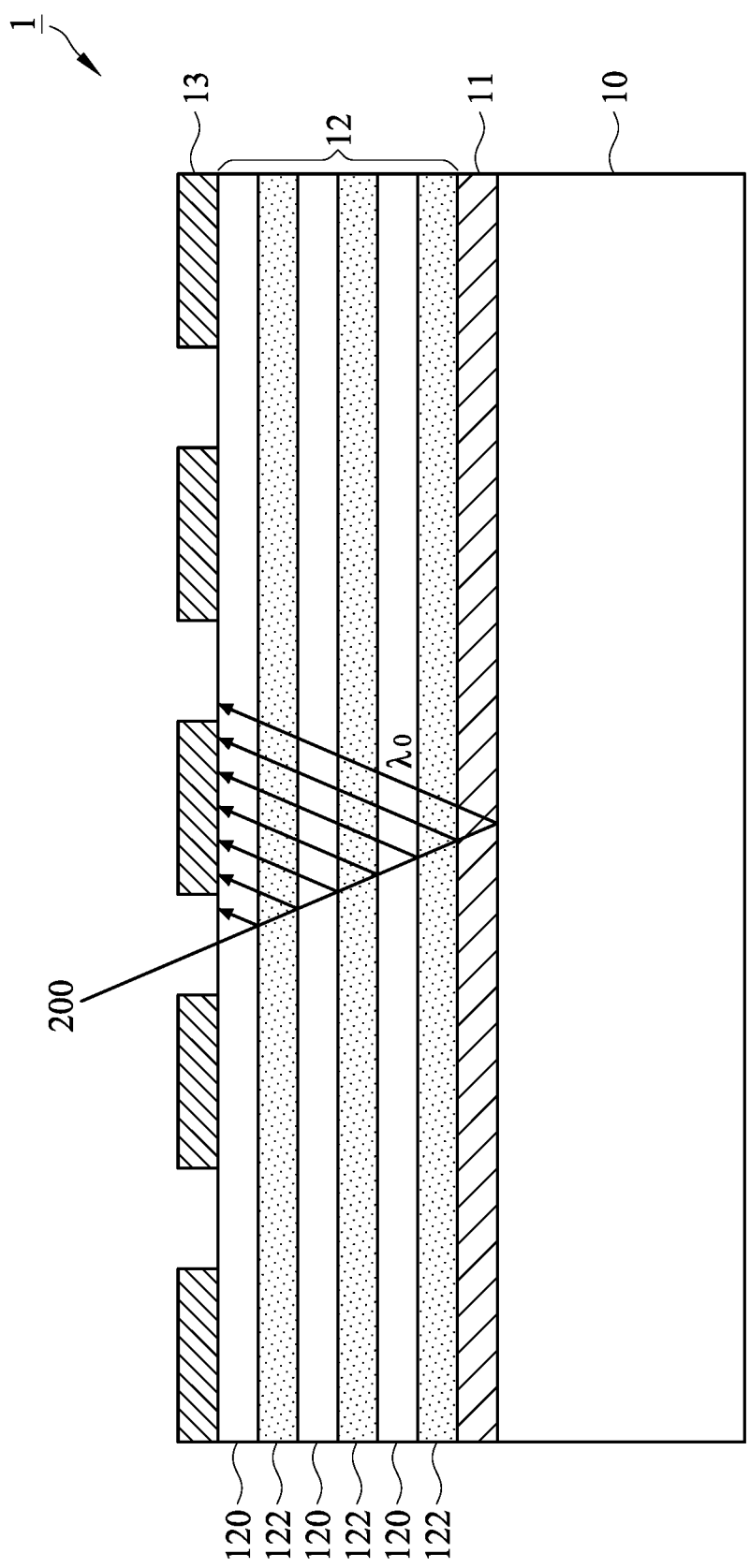
FIG. 1 is a schematic cross-sectional view showing a single-photon detector in accordance with an embodiment of the invention.

FIG. 1 is a schematic diagram showing a single-photon detector 1 in accordance with an embodiment of the invention. Referring to FIG. 1, the single-photon detector 1 is used for detecting an incident light 200 and generally includes a substrate 10, a reflector 12 disposed on the substrate 10, and at least one superconducting wire 13 disposed on the reflector 12. In addition, an optional buffer layer 11 may be interposed between the reflector 12 and the substrate 10. The incident light 200 is irradiated on the at least one superconducting wire 13 and/or is reflected to the at least one superconducting wire 13 by the reflector 12.

Figure 2:
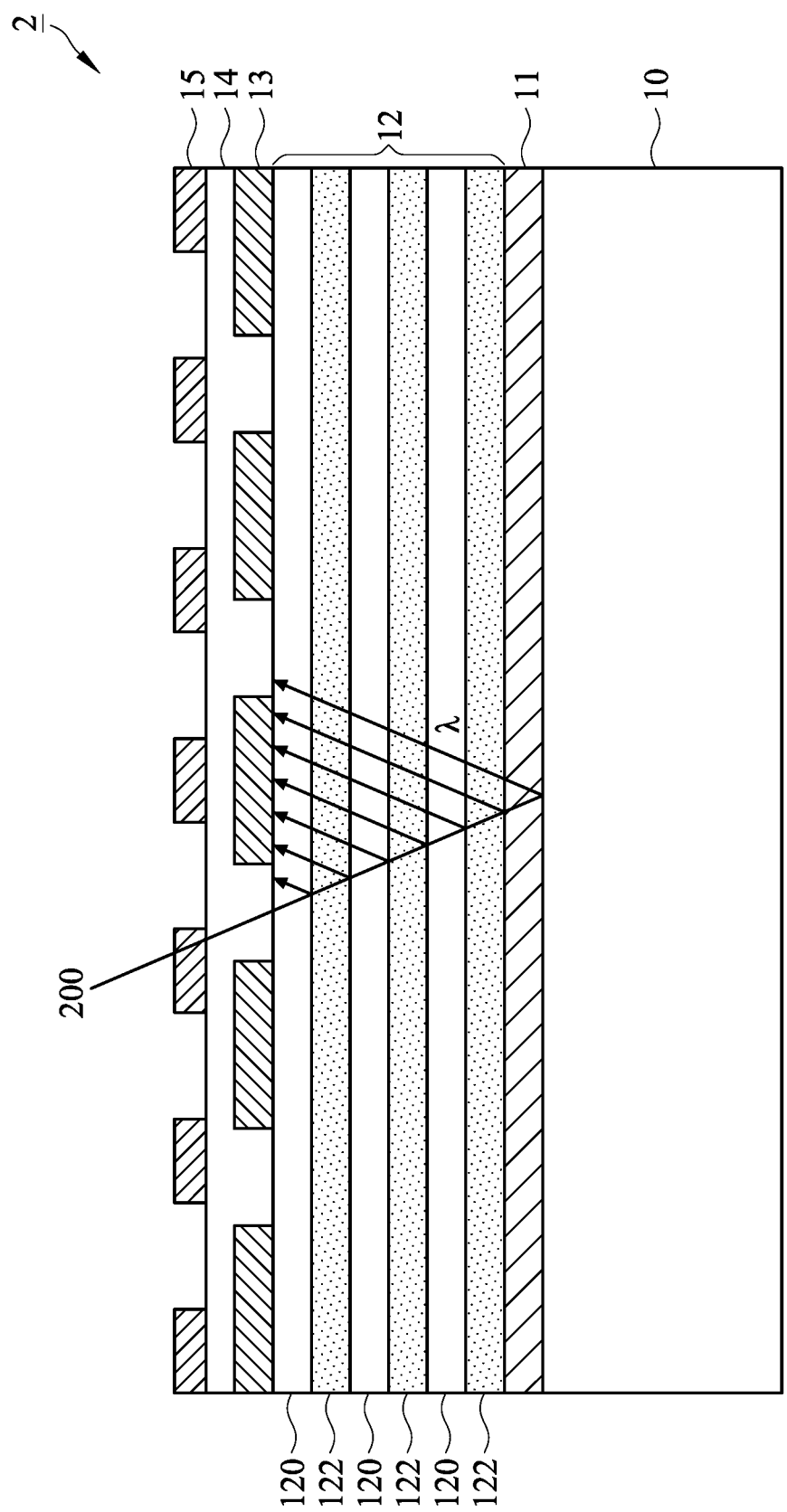
FIG. 2 is a schematic cross-sectional view showing a single-photon detector in accordance with an embodiment of the invention.

FIG. 2 is a schematic diagram showing a single-photon detector 2 in accordance with another embodiment of the invention. The single-photon detector 2 is similar to the single-photon detector 1 described in FIG. 1, except as described below. In addition to the architecture presented in FIG. 1, the single-photon detector 2 further includes: a dielectric layer 14 covering the at least one superconducting wire 13, and a surface-plasmon wavelength-selective surface 15 disposed on the dielectric layer 14. The surface-plasmon wavelength-selective surface 15 includes a nanostructure array configured to enable surface plasmon resonances (SPR) stimulated by the incident light 200 at one or more wavelengths. The surface-plasmon wavelength-selective surface 15 resonantly transmits the incident light 200 within a passband, and the transmitted light is irradiated on the at least one superconducting wire 13 and/or is reflected to the at least one superconducting wire 13 by the reflector 12.

Figure 3:
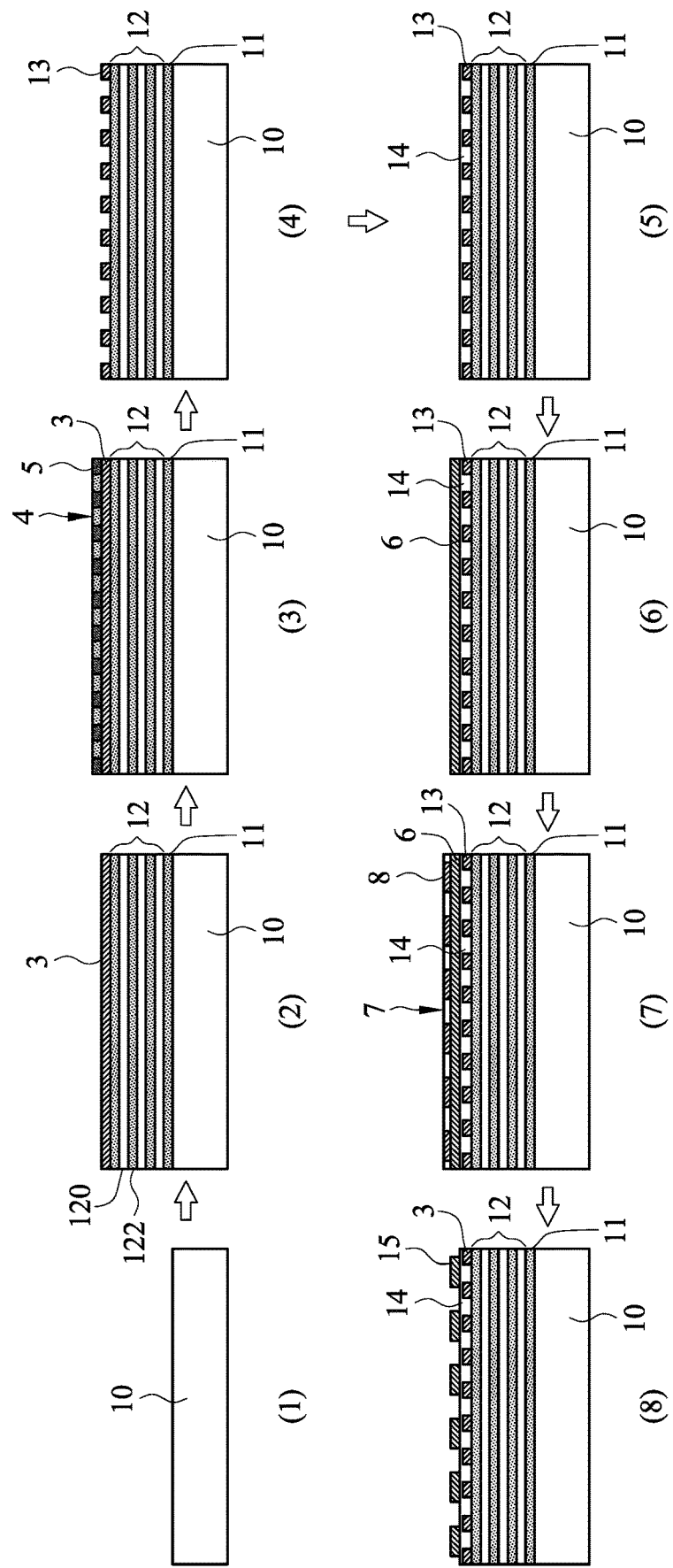
FIG. 3 illustrates a method to fabricate the single-photon detector of FIG. 1 and FIG. 2 in accordance with an embodiment of the invention.

FIG. 3 illustrates a method for fabricating the single-photon detector 1 of FIG. 1, the single-photon detector 2 of FIG. 2. Referring to step (1) of FIG. 2, the substrate 10 is preferably made of silicon carbide, e.g., single-crystalline silicon carbide with the hexagonal crystal structure (4H—SiC). Other embodiments can also be applied to a silicon carbide having other crystal structures, e.g., 6H—SiC or 3C—SiC. The substrate 10 may be made of any other material such as silicon, sapphire ($Al_2O_3$), quartz, other semiconductors, other dielectrics, or even a metal.

Referring to step (2) of FIG. 3, the reflector 12 is preferably multilayered and is deposited or epitaxially grown on the substrate 10 with the optional buffer layer 11. In case of the substrate 10 is not made of, e.g., silicon carbide, the buffer layer 11 may be firstly formed on the top surface of the substrate 10, and then the reflector 20 is formed on the buffer layer 11. The reflector 12 can be a distributed Bragg reflector (DBR) that includes multiple pairs of layers formed of high refractive index and low refractive index materials. The reflector 12 can be formed by alternating deposition of the high and low index materials using a chemical vapor deposition or a physical vapor deposition process, e.g., sputtering, metal-organic chemical vapor deposition (MOCVD), atomic layer deposition (ALD). Preferably, each layer of the reflector 12 is single-crystalline. In the exemplary embodiment, nitrogen-plasma-assisted molecular-beam epitaxy (MBE, a precise form of PVD)$^2$ is adopted to grow alternating single-crystalline high and low index materials on the substrate 10.

The thicknesses and materials (and thus indices of refraction) in the multilayered reflector 12 are selected to increase reflection (reflectivity>99%) in a selected wavelength or wavelength band. For example, the controlled multilayered reflector 12 may be optimized for reflection of light of the center wavelength λ of the passband transmitted from the surface-plasmon wavelength-selective surface 15. In the example shown in FIG. 1, the multilayered reflector 12 may be optimized for reflection of light of the center wavelength $\lambda_0$ of the incident light 200.

In some embodiments, the controlled multilayered reflector 12 includes pairs of high/low refractive index materials, and each pair includes a high-refractive-index layer 120 and a low-refractive-index layer 122. Preferably, both the alternating high-refractive-index layers 120 and the low-refractive-index layers 112 are made of III-nitride materials. In some embodiments, both the alternating high-refractive-index layers 120 and the low-refractive-index layers 122 are made of dielectrics or oxides. In one embodiment, the alternating high-refractive-index layers 120 and the low-refractive-index layers 122 comprise GaN/AlN alternating layers. In one embodiment, the alternating high-refractive-index layers 120 and the low-refractive-index layers 122 comprise $TiO_2/SiO_2$ alternating layers. The index difference between the high-refractive-index layers 120 and the low-refractive-index layers 122 is large, and a few pairs of layers of $\lambda/4$ optical thickness is sufficient to give very high reflectivity (>99%) as a broadband reflector. In some embodiments, the reference number 120 refers to the low-refractive-index layers, and the reference number 122 refers to the high-refractive-index layers. In some embodiments, the reference number 120 refers to the high-refractive-index layers, and the reference number 122 refers to the low-refractive-index layers. Other materials as known in the art could be used as well for the multilayered broadband reflector 12.

Referring to step (2) of FIG. 3, the preferred material of the optional buffer layer 11 is III-nitride, e.g., AlN or $Al_xGa_{1-x}N$. The buffer layer 11 could also be made of an oxide, e.g., silicon dioxide. The buffer layer 11 can be formed using a chemical vapor deposition or a physical vapor deposition process, e.g., sputtering, metal-organic chemical vapor deposition (MOCVD), atomic layer deposition (ALD), or nitrogen-plasma-assisted molecular-beam epitaxy (MBE)[2,3].

Referring to step (2) of FIG. 3, next, a large area of superconducting layer 3 is formed on the multilayered reflector 12 using a chemical vapor deposition or a physical vapor deposition process, e.g., metal-organic chemical vapor deposition (MOCVD) or atomic layer deposition (ALD). Preferably, the superconducting layer 3 is single-crystalline. In the exemplary embodiment, nitrogen-plasma-assisted molecular-beam epitaxy (MBE)[2,3] is adopted to grow the large area of single-crystalline superconducting layer 3 on the multilayered reflector 12.

Referring to step (3) of FIG. 3, a first etching mask 5 is formed on the superconducting layer 3 by using a patterning method, e.g., electron-beam lithography. Referring to step (3) of FIG. 2, for example, a first resist layer 4 is firstly formed on the superconducting layer 3 and then is scanned with a focused beam of electrons to define patterns (exposed regions). The first etching mask 5 is then formed after selective removal of either the exposed or non-exposed regions of the first resist layer 4 by developing.

Referring to step (4) of FIG. 3, by using the first etching mask 5 as a mask, the superconducting layer 3 is etched using, e.g., a reactive ion etching process, to form at least one superconducting wire 13. After that, the first etching mask 5 is stripped. A further electron-beam lithography may be made to define electrode contacts connected with terminals of the superconducting wire 13. After that, the single-photon detector 1 shown in FIG. 1 is fabricated.

So far, two main classes of superconducting materials have been utilized to fabricate high-efficiency SNSPDs[4]: (1) poly-crystalline nitride superconductors such as NbN and NbTiN; (2) amorphous alloy superconductors, such as WSi, MoSi and MoGe. By contrast, material for forming the superconducting layer 3 and thus the at least one superconducting wire 13 is selected from the group consisting of NbN, TiN, $Nb_{1-x}Ti_xN$, TaN, $Nb_{1-x}Ta_xN$, and $MgB_2$. In the exemplary embodiments, the at least one superconducting wire 13 is made of NbN, TiN, TaN, or $MgB_2$. X-ray diffraction patterns reveal that the as-grown NbN, TiN, and TaN films are single-crystalline with (111) orientation, and the as-grown $MgB_2$ film is single-crystalline with hexagonal crystal structure. The grown high-quality and uniform superconducting layer 3, e.g., a NbN film, can have a critical temperature ($T_c$, in Kelvin) of up to about 16 K. The larger difference between the operating temperature and the critical temperature provides superior detection efficiency, lower dark count, and faster temporal response. And the single-photon detectors made from the superconducting layer 3 demonstrate high device yield approaching unity due to the exceptional homogeneity.

In order to fabricate the single-photon detector of FIG. 2, referring to step (5) of FIG. 3, a dielectric layer 14, e.g., an oxide or nitride layer, such as a $SiO_2$ or $SiN_x$ layer, is formed to cover the at least one superconducting wire 13.

Referring to step (6) of FIG. 3, a conductive layer 6 is then formed on the dielectric layer 14. The dielectric layer 14 and conductive layer 6 are formed using a chemical vapor deposition or a physical vapor deposition process, e.g., metal-organic chemical vapor deposition (MOCVD) or atomic layer deposition (ALD). In the exemplary embodiment, nitrogen-plasma-assisted molecular-beam epitaxy (MBE)[3] is adopted to grow the large area of conductive layer 6 and the dielectric layer 14. The conductive layer 6 is made of a plasmonic material, such as aluminum, gold, silver, copper, titanium nitride, or indium tin oxide. In the exemplary embodiment, titanium nitride (TiN) is selected to fabricate the conductive layer 6. Growing a high-quality stoichiometric TiN film requires an ultraclean growth environment because of the propensity of titanium to react with residue gases, e.g., oxygen. In the exemplary embodiment, the TiN film is grown in an ultrahigh vacuum (UHV) chamber, base pressure $\sim 1\times 10^{-10}$ torr, on the dielectric layer 14, and X-ray diffraction pattern (X-ray wavelength: 1.54 Å) reveals that the fabricated TiN film has close-packed, rock-salt crystal structure with (111) orientation.

Referring to step (7) of FIG. 3, a second etching mask 8 is formed on the conductive layer 6 by using a patterning method, e.g., electron-beam lithography. Referring to step (7) of FIG. 2, for example, a second resist layer 7 is firstly formed on the conductive layer 6 and then is scanned with a focused beam of electrons to define patterns (exposed regions). The second etching mask 8 is formed after selective removal of either the exposed or non-exposed regions of the second resist layer 7 by developing.

Referring to step (8) of FIG. 3, by using the second etching mask 8 as a mask, the conductive layer 6 is etched by, e.g., a reactive ion etching process, to form a surface-plasmon wavelength-selective surface 15 having a subwavelength nanostructure array. After that, the second etching mask 8 is stripped. After that, the single-photon detector 2 shown in FIG. 2 is completed.

Figure 4:
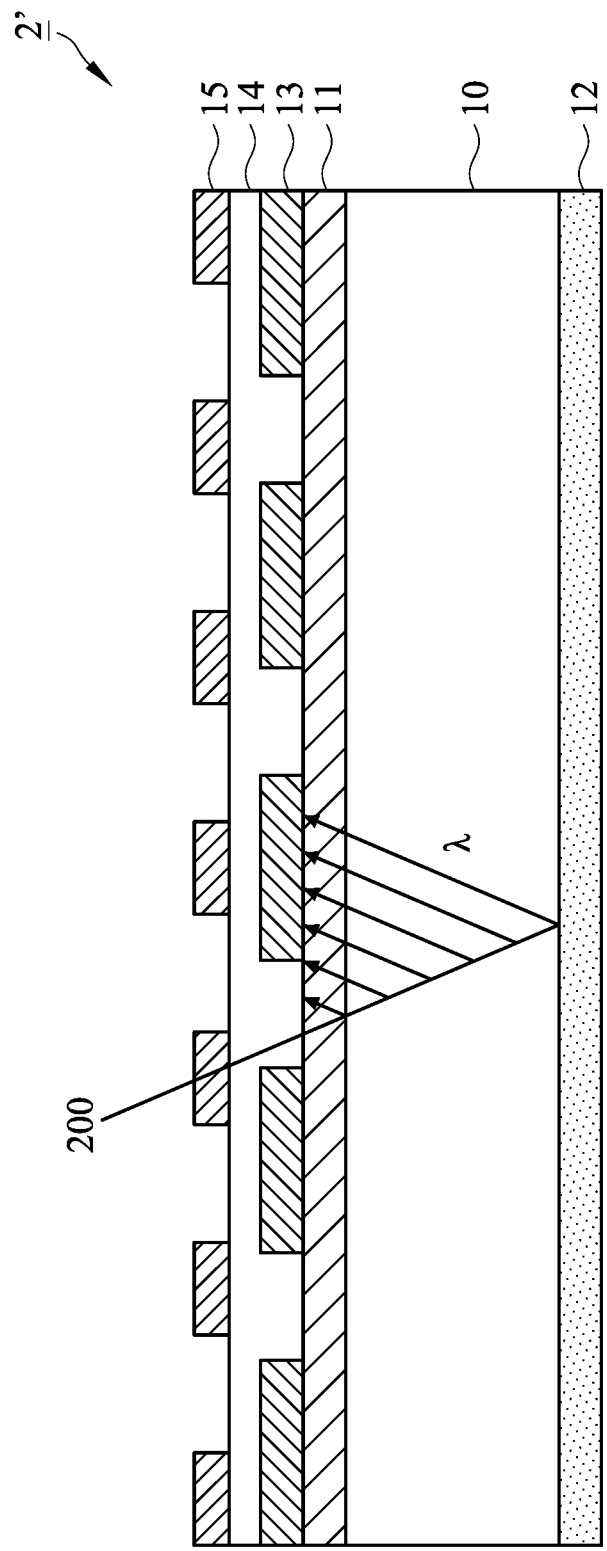
FIG. 4 is a schematic cross-sectional view showing a single-photon detector in accordance with an embodiment of the invention.
Figure 5D:
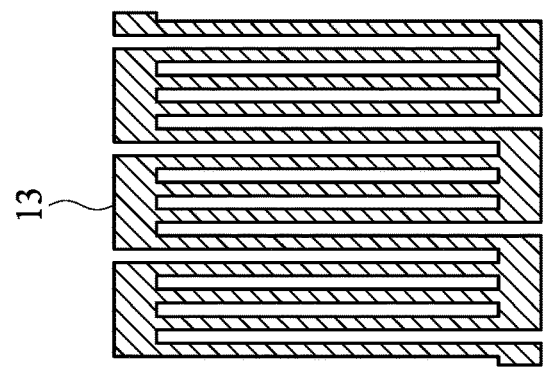
FIGS. 5A to 5D are schematic top views showing superconducting wires in accordance with some embodiments of the invention.
Figure 5C:
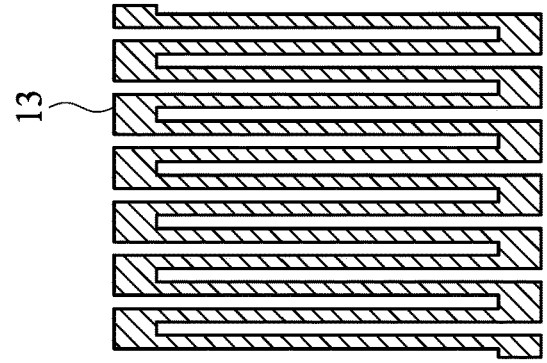
Figure 5B:
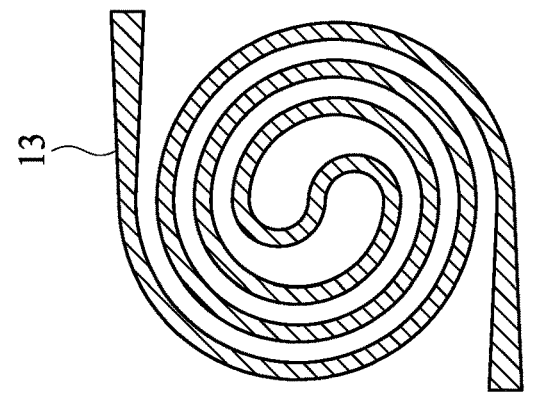
Figure 5A:
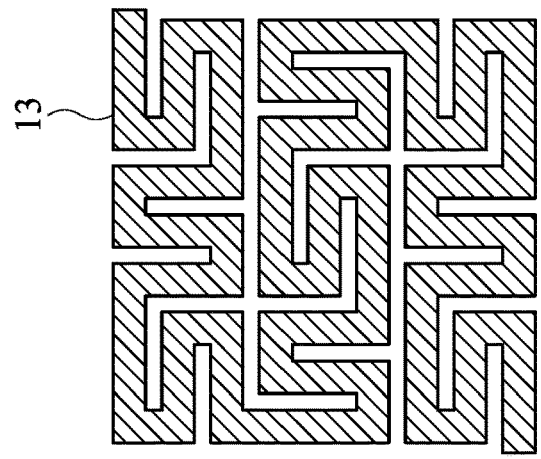

FIG. 4 is a schematic diagram showing a single-photon detector 2' in accordance with another embodiment of the invention. The single-photon detector 2' is similar to the single-photon detector 2 described in FIG. 2, except as described below. In this embodiment, the reflector 12 is preferably single-layered and is formed beneath the substrate 10 using a chemical vapor deposition or a physical vapor deposition process. The single-layered reflector 12 can be made of a metal, e.g., gold, aluminum, or platinum. The single-layered reflector 12 may be optimized for reflection of light of the center wavelength λ of the passband transmitted from the surface-plasmon wavelength-selective surface 15. The single-photon detector 2' can be fabricated by a method similar to that described in FIG. 3.

FIGS. 5A-5D are top views showing a superconducting wire 13 in accordance with some embodiment of the invention. The single-photon detector 2/2' can include at least one superconducting wire 13 disposed on the multilayered reflector 12 or the optional buffer layer 11. The superconducting wire 13 can be connected between conductive electrodes (not shown). As illustrated in FIGS. 5A-5D, the superconducting wire 13 can be arranged in, but not limited to, a Peano, spiral, meandering, or parallel pattern, e.g., backward and forward parallel nanostrips on the reflector 12 or the optional buffer layer 11. In some embodiments, multiple superconducting wires 13 are connected in parallel between two parallel electrodes. In some embodiments, the superconducting wire 13 has an essentially rectangular cross section. In some embodiments, the thickness of the superconducting wire 13 is typically less than 15 nm, and the width of the superconducting wire 13 is between 10 nm and 150 nm.

Referring to FIG. 2, the surface-plasmon wavelength-selective surface 15 having the subwavelength nanostructure array is configured to enable surface plasmon resonance (SPR) stimulated by the incident light 2 at one or more wavelengths. In the plasmonic resonant bands, the incident light is resonantly scattered by the subwavelength nanostructure array. The surface-plasmon wavelength-selective surface 15 resonantly transmits the incident light within a certain range of wavelengths Δλ (passband) with a center wavelength λ, which is precisely determined by the geometry and size (e.g., thickness, width, depth, diameter) of the subwavelength nanostructure (localized surface plasmon resonance, LSPR), as well as the pitch or periodicity of the subwavelength nanostructure array (collective surface plasmon resonance, CSPR).

Figure 6:
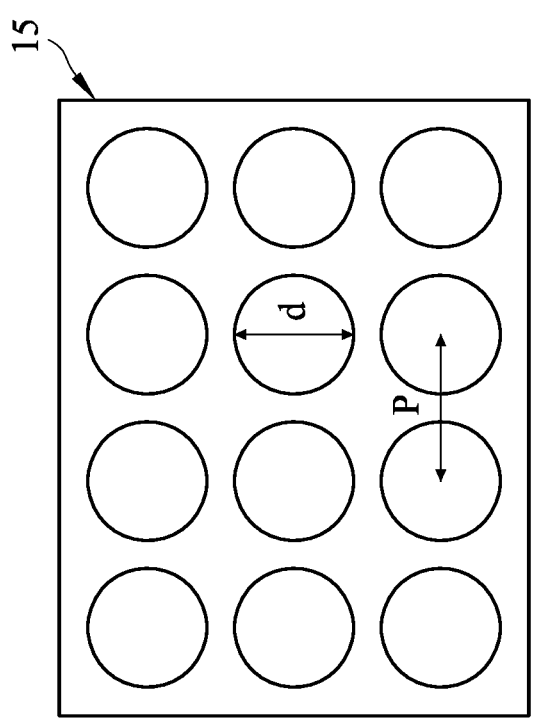
FIG. 6 is a schematic top view showing a surface-plasmon wavelength-selective surface in accordance with an embodiment of the invention.

FIG. 6 is a schematic top view showing a surface-plasmon wavelength-selective surface 15 in accordance with an embodiment of the invention. In the exemplary embodiment, the surface-plasmon wavelength-selective surface 15 includes a nanohole array, and the stimulated one or more resonance wavelengths can be determined by, e.g., the diameter (d) of the nanohole and/or the periodicity (p) of the nanohole array.

Figure 7:
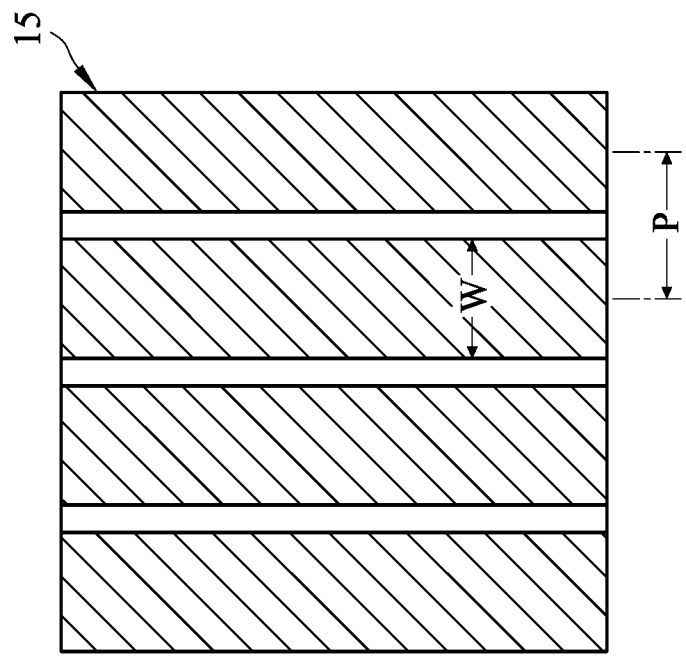
FIG. 7 is a schematic top view showing a surface-plasmon wavelength-selective surface in accordance with another embodiment of the invention.

FIG. 7 is a schematic top view showing a surface-plasmon wavelength-selective surface 15 in accordance with an embodiment of the invention. In the exemplary embodiment, the surface-plasmon wavelength-selective surface 15 includes a nanostrip array, and the stimulated one or more resonance wavelengths can be determined by, e.g., the width (w) of the nanostrip and/or the periodicity (p) of the nanostrip array.

In some preferred embodiments, the lattice mismatch between the substrate 10 and any other layer composing the single-photon detector 1/2/2' is small, typically less than 5%. Table 1 lists the crystal structures, the lattice constants, and the lattice mismatches with respect to SiC substrate of some preferred materials forming composed layers of the single-photon detector 1/2/2'. For example, the lattice mismatch between AlN and 4H—SiC is 0.96%. This allows epitaxial growth of a high-quality AlN film on the 4H—SiC substrate. Respective layers forming the single-photon detector 1/2/2' are epitaxially grown with respect to the 4H—SiC substrate. Epitaxial growth refers to crystal growth in a state of maintaining continuity of lattice from the substrate.

TABLE 1

| material | crystal structure | lattice constant (nm) | lattice mismatch with respect to SiC substrate |
|---|---|---|---|
| 4H—SiC | hexagonal | a = 0.307 c = 1.008 | |
| GaN | hexagonal | a = 0.318 c = 0.516 | 3.50% |
| AlN | hexagonal | a = 0.311 c = 0.498 | 0.96% |
| TiN (111) | cubic | a = 0.425 (a(111) = 0.301) | −2.2% |
| NbN (111) | cubic | a = 0.439 (a(111) = 0.310) | 1.1% |
| TaN (111) | cubic | a = 0.434 (a(111) = 0.307) | ~0% |
| MgB$_2$ | hexagonal | a = 0.308 c = 3.521 | ~0.3% |

Figure 8:
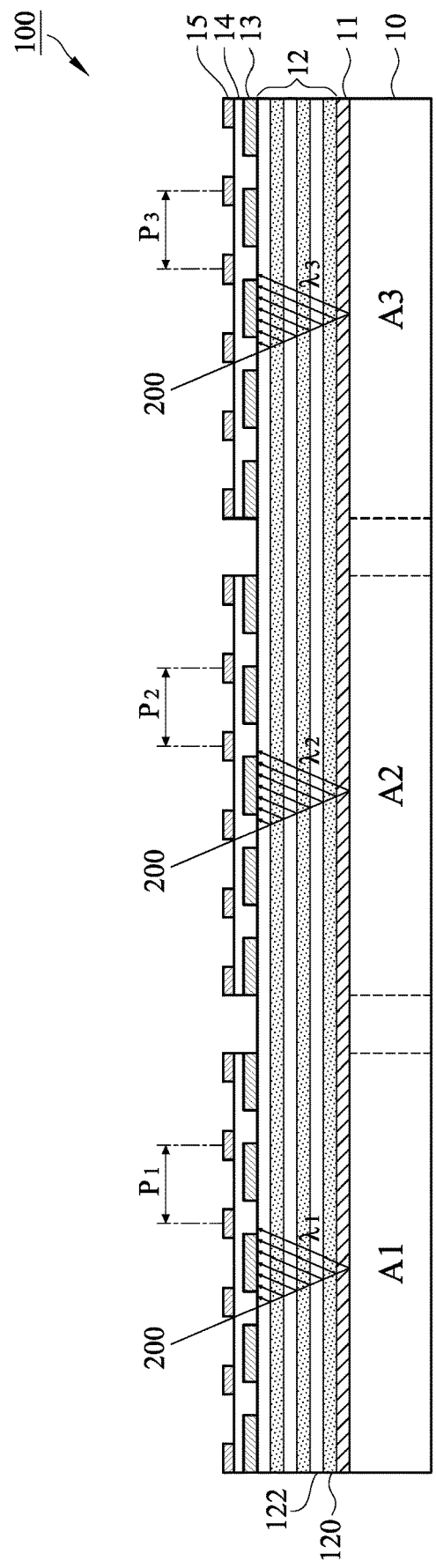
FIG. 8 is a schematic cross-sectional view showing a single-photon detector array in accordance with an embodiment of the invention.

FIG. 8 is a schematic diagram showing a single-photon detector array 100 in accordance with an embodiment of the invention. The single-photon detector array 100 includes single-photon detectors similar to the devices described above with respect to FIGS. 2, 3, and 4, except as described below.

Referring to FIG. 8, the single-photon detector array 100 includes a substrate 10 that is divided into a plurality of areas or pixels, e.g., A1, A2, and A3. In the exemplary embodiment, a multilayered reflector 12 disposed on the substrate 10 or the buffer layer 11 is used as a common reflector for the plurality of pixels. However, each pixel may include an individual reflector 12 in another embodiment. In addition, each pixel includes at least one superconducting wire 13 disposed on the reflector 12, a dielectric layer 14 covering the at least one superconducting wire 13, and a surface-plasmon wavelength-selective surface 15 having a nanostructure array on the dielectric layer 14. The nanostructure array is configured to enable surface plasmon resonance (SPR) stimulated by the incident light 2 at one or more wavelengths. Within each pixel, the surface-plasmon wavelength-selective surface 15 resonantly transmits the incident light 2 within a passband, and the transmitted light is irradiated on the at least one superconducting wire 13 and/or is reflected to the at least one superconducting wire 13 by the reflector 12.

Referring to FIG. 8, in some embodiments, the passband of the surface-plasmon wavelength-selective surface 15 of each pixel differs from that of an adjacent pixel. For example, the surface plasmonic wavelength selective surface 15 of pixels A1, A2, and A3 has a passband Δλ1, Δλ2, and Δλ3, with a center wavelength λ1, λ2, and λ3, respectively. In the exemplary embodiment, Δλ1, Δλ2, and Δλ3 (and hence λ1, λ2, and λ3) are different one another. In the exemplary embodiment, the transmitted center wavelength of the passband of the surface-plasmon wavelength-selective surface 15 of each pixel differs from that of an adjacent pixel. This can be done by that, for example, the nanostructure array of the surface-plasmon wavelength-selective surface 15 of each pixel has an individual periodicity that is different from the adjacent pixels. For example, the periodicities P1, P2, and P3 are different one another in the exemplary embodiment.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

Although specific embodiments have been illustrated and described, it will be appreciated by those skilled in the art that various modifications may be made without departing from the scope of the present invention, which is intended to be limited solely by the appended claims.

All publications, patents and patent applications mentioned in this specification are herein incorporated in their entirety by reference into the specification. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A single-photon detector for detecting an incident light, comprising:
    a substrate;
        a multilayered reflector disposed on the substrate; and
        at least one single-crystalline superconducting wire disposed on the multilayered reflector;
        wherein the incident light is irradiated on the at least one superconducting wire and/or is reflected to the at least one superconducting wire by the multilayered reflector.

2. The single-photon detector according to claim 1, wherein the multilayered reflector comprises alternating high-refractive-index layers and low-refractive-index layers, and both the high-refractive-index and low-refractive-index layers are made of III-nitride materials.

3. The single-photon detector according to claim 2, wherein both the high-refractive-index and low-refractive-index layers are single-crystalline.

4. The single-photon detector according to claim 1, wherein the at least one superconducting wire is made of a material selected from the group consisting of NbN, TiN, $Nb_{1-x}Ti_xN$, TaN, $Nb_{1-x}Ta_xN$, and $MgB_2$.

5. A single-photon detector for detecting an incident light, comprising:
    a substrate;
        a reflector disposed on or beneath the substrate;
        at least one superconducting wire disposed on the reflector or the substrate;
        a dielectric layer covering the at least one superconducting wire; and
        a surface-plasmon wavelength-selective surface comprising a nanostructure array on the dielectric layer, the nanostructure array being configured to enable surface plasmon resonances stimulated by the incident light at one or more wavelengths;
        wherein the surface-plasmon wavelength-selective surface resonantly transmits the incident light within a passband, and the transmitted light is irradiated on the at least one superconducting wire and/or is reflected to the at least one superconducting wire by the reflector.

6. The single-photon detector according to claim 5, wherein the reflector is a multilayered reflector comprising alternating high-refractive-index layers and low-refractive-index layers on the substrate, and both the high-refractive-index and low-refractive-index layers are made of III-nitride materials.

7. The single-photon detector according to claim 6, wherein both the high-refractive-index and low-refractive-index layers are single-crystalline.

8. The single-photon detector according to claim 5, wherein a center wavelength of the passband is determined by the geometry, size, and the periodicity of the nanostructure array.

9. The single-photon detector according to claim 8, wherein the center wavelength can be tuned in wavelength covering ultraviolent, visible, and infrared spectral regions.

10. The single-photon detector according to claim 5, wherein the at least one superconducting wire is made of a material selected from the group consisting of NbN, TiN, $Nb_{1-x}Ti_xN$, TaN, $Nb_{1-x}Ta_xN$, and $MgB_2$.

11. The single-photon detector according to claim 5, wherein the at least one superconducting wire is single-crystalline.

12. The single-photon detector according to claim 5, wherein crystal lattices between the substrate and any of the composed layers of the reflector, as well as the at least one superconducting wire are matched for epitaxial growth.

13. The single-photon detector according to claim 5, wherein the reflector is disposed on the substrate, and a buffer layer is interposed between the substrate and the reflector.

14. The single-photon detector according to claim 5, wherein the reflector is disposed beneath the substrate, and a buffer layer is interposed between the substrate and the at least one superconducting wire.

15. The single-photon detector according to claim 5, wherein the nanostructure array is a nanohole array.

16. The single-photon detector according to claim 5, wherein the nanostructure array is a nanostrip array.

17. The single-photon detector according to claim 5, wherein the nanostructure array is made of a plasmonic material selected from the group of metallic materials consisting of aluminum, gold, silver, copper, titanium nitride, and indium-tin-oxide.

18. A single-photon detector array for detecting an incident light, comprising:
    a substrate;
    a plurality of pixels on the substrate, each of the plurality of pixels comprising,
        a reflector deposited on or beneath the substrate;
        at least one superconducting wire deposited on the reflector or the substrate;
        a dielectric layer covering the at least one superconducting wire; and
        a surface-plasmon wavelength-selective surface comprising a nanostructure array on the dielectric layer, the nanostructure array being configured to enable surface plasmon resonances stimulated by the incident light at one or more wavelengths;

wherein the surface-plasmon wavelength-selective surface resonantly transmits the incident light within a passband having a center wavelength, and the transmitted light is irradiated on the at least one superconducting wire and/or is reflected to the at least one superconducting wire by the reflector.

19. The single-photon detector array according to claim 18, wherein the center wavelengths of the transmitted passbands of two adjacent ones of the plurality of pixels are different.

20. The single-photon detector array according to claim 18, wherein the reflector is a multilayered reflector comprising alternating high-refractive-index layers and low-refractive-index layers on the substrate, and both the high-refractive-index and low-refractive-index layers are made of III-nitride materials.

21. The single-photon detector array according to claim 20, wherein both the high-refractive-index and low-refractive-index layers are single-crystalline.

22. The single-photon detector array according to claim 18, wherein the center wavelength of the passband is determined by the geometry, size, and the periodicity of the nanostructure array.

23. The single-photon detector array according to claim 18, wherein the center wavelength can be tuned in wavelength covering ultraviolet, visible, and infrared spectral regions.

24. The single-photon detector array according to claim 18, wherein the at least one superconducting wire is made of a material selected from the group consisting of NbN, TlN, $Nb_{1-x}Ti_xN$, TaN, $Nb_{1-x}Ta_xN$, and $MgB_2$.

25. The single-photon detector array according to claim 18, wherein the at least one superconducting wire is single-crystalline.

26. The single-photon detector array according to claim 18, wherein crystal lattices between the substrate and any of the composed layers of the reflector, as well as at least one superconducting wire are matched for epitaxial growth.

27. A method for fabricating a single-photon detector, comprising the steps of:
providing a substrate;
forming a reflector on or beneath the substrate;
using molecular-beam epitaxy to grow a single-crystalline superconducting layer on the reflector or the substrate under ultrahigh vacuum (UHV) conditions; and
patterning the superconducting layer to form at least one superconducting wire on the reflector or the substrate.

28. The method according to claim 27, further comprising:
forming a dielectric layer to cover the at least one superconducting wire;
forming a conductive layer on the dielectric layer; and
patterning the conductive layer to form a surface-plasmon wavelength-selective surface comprising a nanostructure array configured to enable surface plasmon resonances stimulated by an incident light at one or more wavelengths.

29. The method according to claim 27, wherein the reflector is formed on the substrate, and the method further comprises forming a buffer layer between the substrate and the reflector.

30. The method according to claim 27, wherein the reflector is formed beneath the substrate, and the method further comprises forming a buffer layer between the substrate and the at least one superconducting wire.

* * * * *